United States Patent [19]

Burton et al.

[11] Patent Number: 5,182,166

[45] Date of Patent: Jan. 26, 1993

[54] WEAR-RESISTANT COMPOSITE STRUCTURE OF VITREOUS CARBON CONTAINING CONVOLUTED FIBERS

[76] Inventors: Ralph A. Burton; Ralph G. Burton, both of 1825 Ridge Rd., Raleigh, N.C. 27607

[21] Appl. No.: 694,112

[22] Filed: May 1, 1991

[51] Int. Cl.$^5$ ............................................. C01B 31/02
[52] U.S. Cl. ..................... 428/368; 428/367; 428/408; 428/698; 428/627; 428/401; 188/251 R; 384/42; 523/149; 523/153; 523/157; 523/158
[58] Field of Search ............... 428/368, 408, 367, 698, 428/627, 401; 523/149, 153, 157, 158; 188/251 R; 384/42

[56] References Cited

U.S. PATENT DOCUMENTS

| | | | |
|---|---|---|---|
| 3,109,712 | 11/1963 | Redfern | 23/209.2 |
| 3,284,371 | 11/1966 | Krelner | 252/502 |
| 3,626,042 | 11/1971 | Appleby et al. | 264/29 |
| 3,719,452 | 3/1973 | Accountius | 423/449 |
| 3,790,393 | 2/1974 | Cowland et al. | 106/56 |
| 4,137,477 | 1/1979 | Krol et al. | 252/502 |
| 4,143,292 | 3/1979 | Hosoki et al. | 313/336 |
| 4,150,011 | 4/1979 | Searfoss et al. | 523/153 |
| 4,187,209 | 2/1980 | Searfoss et al. | 524/432 |
| 4,188,369 | 2/1980 | Rautavuori et al. | 423/449 |
| 4,198,382 | 4/1980 | Matsui | 423/445 |
| 4,225,569 | 9/1980 | Matsui et al. | 423/445 |
| 4,373,038 | 2/1983 | Moraw et al. | 524/440 |
| 4,526,924 | 7/1985 | Korb | 524/541 |

FOREIGN PATENT DOCUMENTS

| | | |
|---|---|---|
| 56-9693 | 1/1981 | Japan . |
| 58-55010 | 4/1983 | Japan . |
| 58-131429 | 8/1983 | Japan . |
| 2049713A | 12/1980 | United Kingdom . |

OTHER PUBLICATIONS

Burton, R. A., et al., "Vitreous Carbon Matrix for Low-Wear Carbon/Metal Current Collectors", IEEE Transactions on Components, Hybrids, and Manu. Technology, vol. 12, No. 2, 1989, pp. 224–228.

Burton, R. G. et al., "Tribology of Carbon Matrix Composites, Tribology of Composite Materials", Edited by P. K. Rohatgi, et al., American Soc. for Met. Metals Park, Ohio, 1990, p. 309 et seq.

"Quacorr ® 1004 Resin", Material Safety Data Sheet (5 pages) from QO Chemicals Oakbrook, Il., Feb. 1985.

Burton, R. A. et al., "Ultra-Low Wear in Carbon Matrix Materials", Tailored Materials Symposium, Sponsored by Soc. for Metals, cicra 1987–88.

Vook, et al, "Characterization of Vitreous Carbon Having Ultra-Low Friction and Wear", Electrical Contacts and Electromechanical Components, Proceedings of the International Conf. on Electrical Contacts, Beijing, China May 9, 1989, pp. 67–77.

Burton, R. A. et al., "Laser Machining for Advanced Seals", Jan. 4, 1991, National Science Foundation Meeting, Austin, Tex.

Burton, R. A. et al., "Friction and Wear of Glassy Carbon in Sliding Contact", Final Report, U.S. Dept. of Energy Contract No. DE-AC02-88 CE 90027, Sep. 1, 1989.

Primary Examiner—George F. Lesmes
Assistant Examiner—Beverly A. Pawlikowski
Attorney, Agent, or Firm—Steven J. Hultquist

[57] ABSTRACT

A wear-resistant composite structure which is especially suitable for use in the formation of sealing components, brake linings, electrical motor brushes, bearings, and like products, is disclosed. This composite structure includes as its primary component vitreous carbon in a continuous phase, and strengthening fibers interspersed throughout the vitreous carbon in a discontinuous phase. These fibers are individually convoluted in configuration, so as to improve the crack-resistance and other physical properties of the vitreous carbon. A suitable method of forming such wear-resistant composite structure is also disclosed.

17 Claims, 5 Drawing Sheets

WEAR-RESISTANT COMPOSITE STRUCTURE OF VITREOUS CARBON CONTAINING CONVOLUTED FIBERS

The present invention relates generally to the use of vitreous carbon material in wear-resistant structures, and more particularly to a composite structure of vitreous carbon material containing specifically defined strengthening fibers and a specific method of making the composite structure.

It is well known in the art to utilize vitreous carbon material, even fiber-reinforced vitreous carbon material, in forming wear-resistant composite structures especially suitable for use in the formation of such components as electrical motor brushes, brake linings, and the like. See for example, the inventors' own publication entitled "VITREOUS CARBON MATRIX FOR LOW-WEAR CARBON/METAL CURRENT COLLECTORS", *IEEE Transactions On Components, Hybrids, and Manufacturing Technology*, Volume 12, Number 2, 1989, pp. 224-228. This particular publication discusses electrical brushes, bearings, and seals and describes in some detail the formation of a continuous matrix of vitreous carbon around fibers of copper. There are numerous other publications directed to vitreous carbon alone and in combination with reinforcing fibers. In particular, glassy carbons have been made commercially by pyrolysis of a number of thermosetting polymers, including cellulose, phenolics, furans, and furfural and furfural alcohol and its oligomer. Glassy carbons may be formed over cloths of carbon, or metal fibers, as for example, the copper fibers referred to in the inventors' own publication recited above, or sandwiches of such cloths. However, the inventors have discovered that there is a tendency for this fiber-laden vitreous carbon material to crack during formation. As will be seen hereinafter, the inventors have also discovered a way to minimize this problem and thereby improve their own fiber reinforced vitreous carbon material, while, at the same time, developing an especially reliable process for forming the composite material.

In view of the foregoing, it is an object of the present invention to provide a fiber-reinforced vitreous carbon material which is especially suitable for use in the formation of wear-resistant products such as sealing components, brake linings, electrical motor brushes, and bearings, and which displays a high degree of crack resistance.

A more particular object of the present invention is to achieve the aforementioned crack resistance, in an uncomplicated, economical, and reliable way.

Another particular object of the present invention is to provide a reliable process for making the crack resistant, fiber-reinforced vitreous carbon material disclosed herein.

Yet another particular object of the present invention is to provide a process methodology that permits non-granular matrix vitreous carbon articles of at least 100 mm in each of its three dimensions.

Still a further object of the present invention is to form sealing components, brake linings, electrical motor brushes, bearings, and other wear-resistant structures from the fiber-reinforced vitreous carbon material disclosed herein.

As will be described in more detail hereinafter, a wear-resistant composite structure, which is especially suitable for use in the formation of sealing components, brake linings, electrical motor brushes, bearings, and like products, is disclosed herein. This composite structure includes as its primary component vitreous carbon which is provided in a non-granular, continuous phase and which serves as the main body of the composite structure. This structure also includes strengthening fibers dispersed throughout the vitreous carbon continuous phase. In accordance with the present invention, these fibers are individually convoluted in configuration, so as to improve the crack resistance of the vitreous carbon material. Specifically, utilizing convoluted fibers, especially when they are provided so as to touch one another only at occasional points, other advantages of the overall composite structure are achieved. These advantages will be discussed in detail hereinafter.

The composite structure of the present invention is suitably formed by a process in accordance with another aspect of the present invention. As will be described more fully hereinafter, a bed of the convoluted fibers is initially placed within a sealable chamber. A liquid precursor material which is polymerizable and subsequently pyrolyzable to form vitreous carbon is provided. This precursor is introduced into the bed of fiber so as to encapsulate the latter, with the encapsulation being carried out so that the precursor substantially completely impregnates the bed of fibers, filling the voids between fibers. Thereafter, the precursor is polymerized and eventually pyrolyzed to form the convoluted fiber-containing vitreous carbon which can then be used to make the desired wear-resistant structure.

The composite itself and its method of manufacture will be described hereinafter in conjunction with the drawings, wherein.

Figure 1:
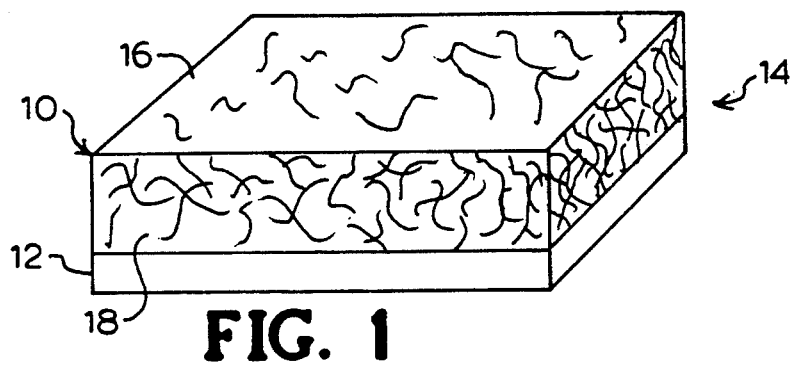
FIG. 1 is a perspective view of a wear-resistant composite structure in accordance with one embodiment of the present invention, for example, a brake lining or an electrical motor brush.

Turning now to the drawings, attention is directed to FIG. 1 which illustrates a wear-resistant composite structure 10 which is designed in accordance with the present invention and which is shown in combination with a base member 12 to form an electrical motor brush or a brake lining which is generally indicated by the reference numeral 14. Wear-resistant composite structure 10 includes as its primary component a main body of vitreous carbon 16 provided in a continuous phase and strengthening fibers 18 interspersed throughout the vitreous carbon non-granular, discontinuous phase. As will be seen in more detail hereinafter and as discussed briefly above, the vitreous carbon is initially formed of a liquid precursor material which has been polymerized by means of a catalyst and pyrolyzed. As also indicated previously, fibers 18 are convoluted in configuration, in accordance with the present invention, to provide the previously set forth advantage and others to be discussed.

In a preferred embodiment, convoluted fibers 18 are wool or mesh in configuration and uniformly dispersed throughout vitreous carbon 16 so that these fibers touch only at occasional points. The precise fiber content of the overall composite may vary depending upon its intended use and depending upon the particular fibers selected. Generally speaking, however, the fiber content may vary from about 5% to about 30% by volume, preferably between 10% and 25% by volume, and from about 5% to about 75% by weight, and preferably between 30% and 70% by weight in the case of copper-based mesh. Because the mesh or wool fibers are spatially nearly constant throughout the vitreous carbon, the void space of the fiber matrix (before impregnation with resin or other vitreous carbon precursor material) varies from about 70% to about 95%, and preferably from 75% to 90% (which are the complement of the volume percent ranges). The preferred fibers are bronze wool fibers displaying irregular cross sections and a mean diameter between about 30 and 100 microns, most preferably between about 30 and 50 microns. These fibers may be cut as short as 1 cm and may in individual lengths be up to approximately 1 meter long or even longer. The fibers usefully employed in the composites of the invention may suitably be made by known cutting or turning processes which guarantee that they are inherently wavy or convoluted. The fibers can be rolled from a spool and be of sufficient length relative to the spool so as to have made several revolutions around the spool. While fibers 18 must be convoluted, which can be achieved by providing a wool or mesh (or woven) configuration, the present invention is not limited to bronze wool or other specific metal fibers. Fibers of materials such as nickel, cotton, and paper, as well as other suitable materials, are also compatible with the present invention so long as they too are convoluted in configuration, although metal fibers are preferred, most preferably copper, copper alloy (brass or bronze), nickel or chrome-plated steel.

Figure 2:
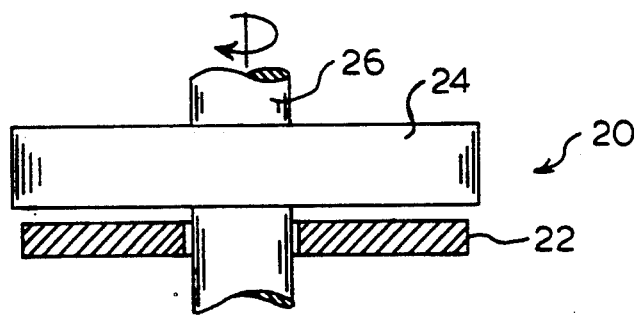
FIG. 2 is a side elevational view, in partial cross-section, of a sealing member in accordance with another embodiment of the present invention.
Figure 3:
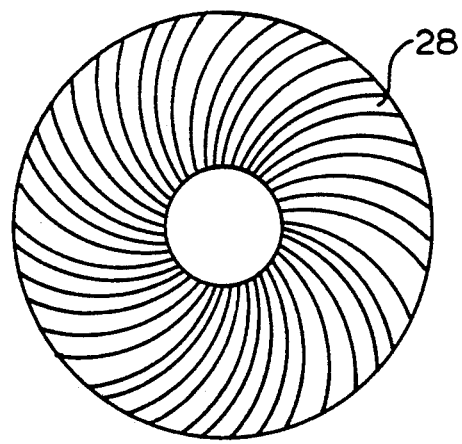
FIG. 3 is a plan view of the underside of the sealing member of FIG. 2.

Still referring to FIG. 1, wear-resistant composite structure 10 is shown as a block supported on the separate base 12 to form an electrical motor brush or brake lining 14. In this regard, it is to be understood that the composite structure is depicted diagrammatically and is not necessarily intended to accurately replicate all or even part of an actual electric motor brush or brake lining. As will be described hereinafter, the wear-resistant structure can be readily formed into the shape shown as well as other desired shapes. For example, FIGS. 2 and 3 illustrate a sealing assembly 20 including a static seal 22 positioned in confronting relationship with a dynamic seal 24 mounted for rotation to a rotating shaft 26. Both of these seals are constructed of the convoluted fiber-containing vitreous carbon structure illustrated in FIG. 1 and shaped to conform with their intended use. Note specifically that the interior surface of the static seal 22 has been provided with a series of grooved surfaces 28 which can be readily provided in the fiber-containing vitreous carbon material.

Figure 4:
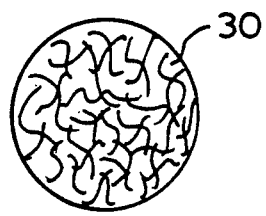
FIG. 4 is a plan view of a bearing in accordance with a further embodiment of the present invention.

FIG. 4 illustrates as a further example a spherical bearing 30 which is also constructed of the same convoluted fiber-containing vitreous carbon material.

These are but a few examples of the ways in which a wear-resistant carbon structure in accordance with the present invention can be used in wear-resistant products.

Figure 5:
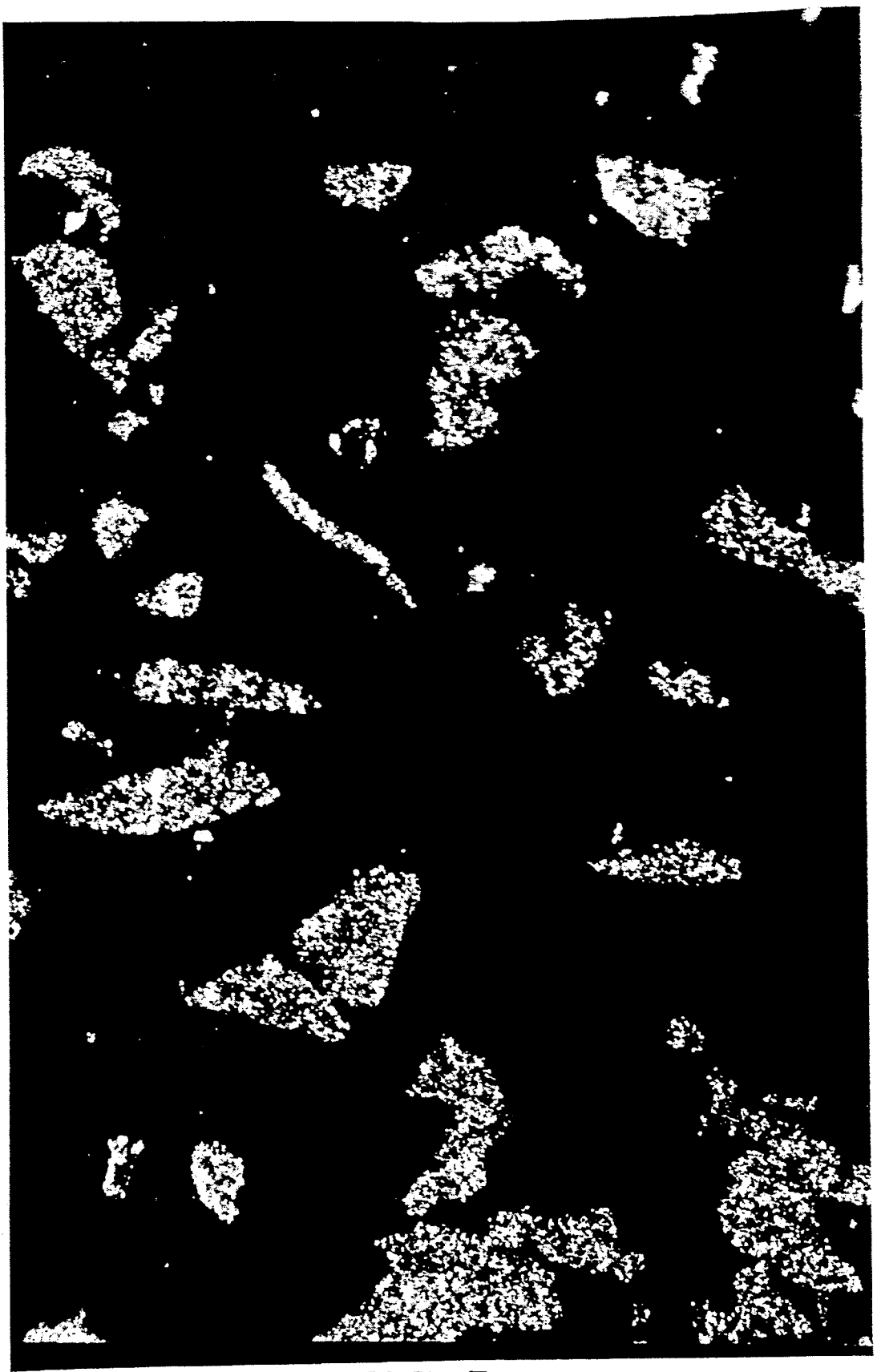
FIGS. 5 and 6 are micrographs of a convoluted fiber-laden non-granular, continuous phase vitreous carbon material formed in accordance with the present invention and making up most if not all of the composite structures shown in FIGS. 1-4.
Figure 6:

Turning now to FIGS. 5 and 6, dark field and bright field micrographs, respectively, of composites according to the invention, are illustrated. These micrographs are sections of a vitreous carbon composite formed in accordance with the present invention, utilizing a copper alloy mesh as convoluted reinforcing fibers. In the bright field micrograph, the copper filament bodies are clearly visible, as interspersed with voids (dark circles) which may have a diameter on the order of about 50 microns. These voids are non-deleterious to the structural and mechanical properties of the composite, and may in some manner enhance the structural character and performance properties of the material. These micrographs were taken at a magnification of 260×.

Having described convoluted fiber-containing vitreous carbon structure 10, attention is now directed to the way in which this structure may be made in accordance with the present invention. To that end, reference is specifically made to the flow chart depicted in FIG. 7 which represents a step-by-step process for making a convoluted fiber-containing vitreous carbon structure 10 in accordance with the present invention. As indicated by this flow chart, the first step in the process is to provide a sealing chamber. A suitable chamber is generally indicated at 32 in FIG. 8. This chamber is provided by an overall pressure vessel 38 which may be a commercial paint-spray tank. Its lid 34 is held down by four toggle bolts, only two of which 35 and 36 are shown in FIG. 6. The vessel includes three penetrations through bosses in lid 34. A penetration P is used for evacuating the chamber and/or for pressurizing it. Suitable vacuum/pressurizing means (not shown) may be readily provided for this purpose. The tube T, which may be elastomeric in construction, communicates through a bulk head fitting in the lid. One end of the tube extends into chamber 32 and its other end is connected to an external peristaltic pump (not shown). As will be seen hereinafter, this pump is used to introduce certain materials into the chamber 32. A lowermost end section of tube T extends into a beaker BK disposed within the chamber through a piston head CP. The piston head is mounted loosely within the beaker to one end of a threaded rod TR passing through a packing gland PG in lid 34. The piston head is movable vertically downward within the beaker in an accurately controlled manner by externally manipulating threaded rod TR.

Figure 7:
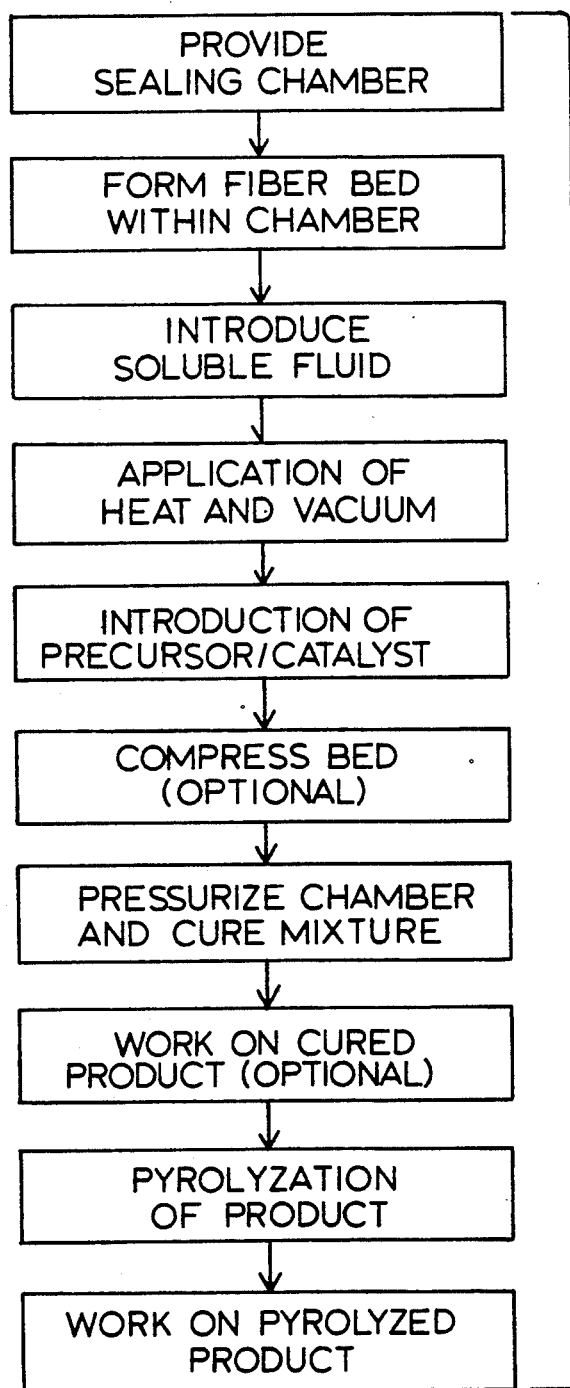
FIG. 7 is a flow chart, in block diagram form, illustrating a process in accordance with one aspect of the present invention, for making the various wear-resistant structures illustrated in FIGS. 1-4.
Figure 8:
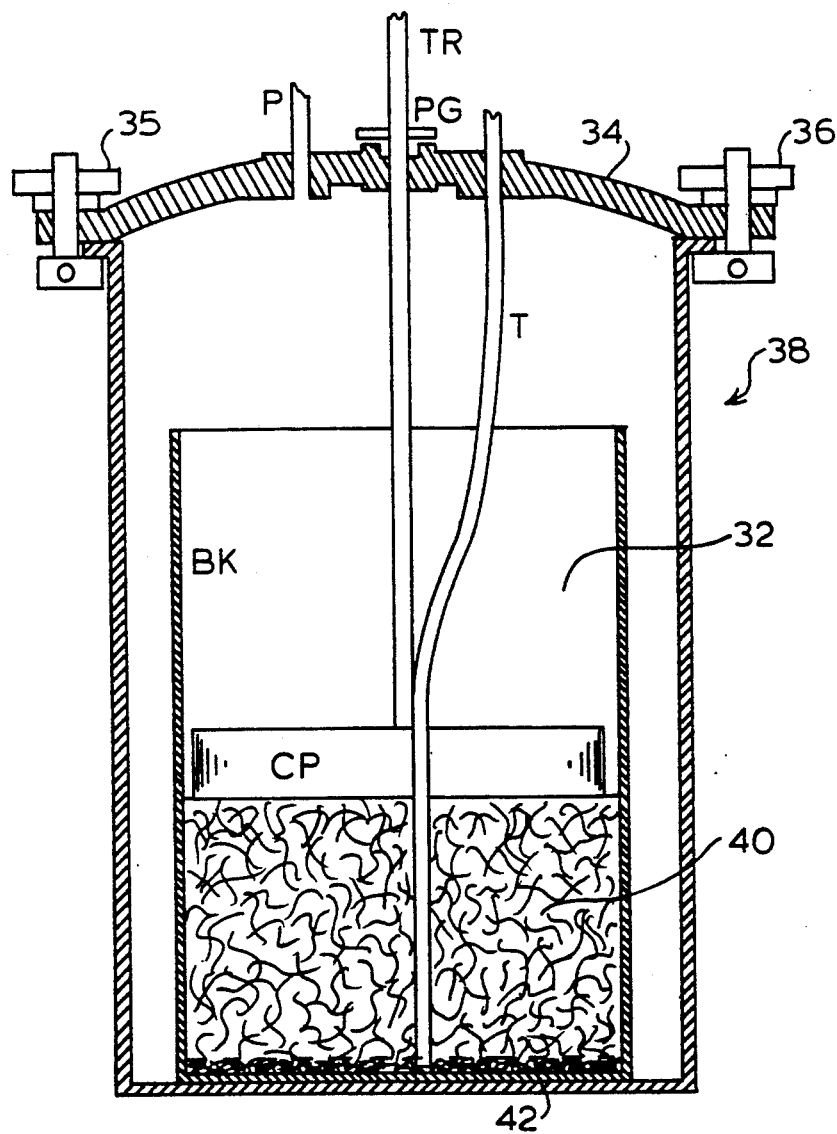
FIG. 8 is a diagrammatic illustration of a chamber assembly and selected associated components which may be used in carrying out the process of FIG. 7.

Having described chamber 32 and the overall components associated with this chamber, attention now is directed to the next step in the overall process, as set forth in the flow chart depicted in FIG. 7. As seen there, a fiber bed is formed within the chamber. Specifically, a bed of the previously described convoluted fibers 18 is formed within beaker BK, as indicated at 40. These wavy fibers which preferably touch one another only at occasional points may be either directionally oriented or a random mesh. In either case, this bed of fibers preferably sets on a cushion of more loosely packed fibers, generally indicated at 42. These lower loosely packed fibers act as a lower plenum. Once the fiber bed 40 has been formed over the looser layer of fibers 42, the lid 24 is closed and the piston head is lowered into the beaker to hold the bed in place, as illustrated in FIG. 8.

Eventually, as will be seen, the bed 40 of convoluted fibers will be filled with a liquid precursor used ultimately to form the vitreous carbon material 16 (FIG. 1). In order to ensure that the precursor impregnates the bed of fibers, filling all of the voids between fibers within the bed and in order to reduce the probability of trapped bubbles of insoluble air within the fiber bed, a volatile, soluble liquid may be introduced into member 32 and specifically into beaker BK below fiber bed 40 through tube T. At the same time, the chamber is sealed and a vacuum is pulled through penetration P. In addition, the chamber is simultaneously heated sufficient to vaporize the liquid which then displaces the air within the bed of fibers, filling the fiber mesh with soluble vapor. Chamber 32 may be heated by means of suitable heating members, for example infrared lamps or band heaters (not shown), located outside vessel 38, or the entire vessel may be disposed within a cooperating oven. The volatile liquid may be of any suitable or readily providable kind, including, but not limited to, water, acetone, and furfural alcohol monomer, so long as the volatile liquid is compatible with the precursor used to form the vitreous carbon. The degree to which the chamber must be heated in this step depends upon the particular volatile liquid used. For example, in the case of furfural alcohol, the chamber is desirably elevated to a temperature of at least 65° C., and more preferably at least 100° C.

The next step in the formation of convoluted fiber-containing vitreous carbon structure 10 is to introduce into the fiber bed 40 the particular precursor used to ultimately form the vitreous carbon material. As indicated previously, any suitable liquid precursor material will suffice, so long as it is polymerizable and subsequently pyrolyzable to form the vitreous carbon material. One preferred precursor is furfural alcohol resin, specifically one manufactured by QO Chemicals, Inc. under the trade name QUA CORR (which is a registered trademark of QO Chemicals, Inc.). Before being introduced into the fiber bed, the precursor may be mixed with any suitable and readily providable catalyst. The catalyst may be one which acts continuously from the time of mixing and without the addition of heat. However, the preferred catalyst is one which acts slowly until activated by the elevation of temperature. This type of catalyst is particularly attractive because its action may be controlled by the individual who is forming the material and because it does not force time restrictions on the filling or subsequent working of the material. A preferred example of this type of catalyst is zinc chloride, which is activated at and above temperatures of approximately 90°-100° C. Regardless of the catalyst selected, it must be one which is effective to cause, promote, or accelerate polymerization of the precursor selected.

For the preferred furfural alcohol resin cited above, fast catalysts may be used in a fiber bed of metallic fiber. In this case, the precursor resin material will go "critical" thermally (i.e., heat-cure and be pyrolyzed) in regions that are not filled with fiber (outside the bed). Good conductive fiber distribution can extend the size of the bed catalyzable by fast catalysts such as maleic acid or maleic anhydride. Slow catalysts, which allow leisurely formation and later catalysis of the polymerization reaction by heating, may be selected from the group of Lewis acids. Zinc chloride is a suitable catalyst; also acceptable are ferric chloride, ammonium chloride, and ammonium sulfate. Magnesium chloride will also work but offers no advantage over zinc chloride.

Once the precursor/catalyst mixture is provided, it is introduced into the fiber bed 40 through tube T where it enters the bed from its underside. As the precursor/catalyst mixture moves upward through the fiber bed, it displaces the previously introduced soluble vapor, although possibly trapping small bubbles of vapor. This process continues until the desired amount of precursor/catalyst mixture has been introduced sufficient to fill the fiber bed. At this time, if a temperature activated catalyst has been used, the temperature of the filled bed is raised slowly to a temperature at or above the activation temperature of the catalyst. In the case of zinc chloride, as stated previously, polymerization occurs rapidly around 90° C.-100° C.

The next step in the process, which is optional, is to further lower the piston head CP in order to further compact the fiber bed. In this regard, note that the piston fits loosely within the beaker so as to displace the precursor upward between the piston and beaker without compressing the precursor. This fiber bed compaction step serves a number of purposes. First and foremost, it reduces the volume of the fiber bed to a prescribed value. Knowing the weight of the fiber, the fiber density may be predetermined by the final volume of the pressing process, allowing for known shrinkage of the body in subsequent operations to be described. In addition, this step aids in causing the precursor to fill in any voids remaining in the fiber bed.

While not shown in the flow diagram of FIG. 7, prior to, during, or after the compaction step just described, chamber 32 may be subjected to inert gas pressure by the admission of nitrogen thereinto. Providing a pressure as small as 1 M Pa is sufficient to reduce an insoluble bubble of air that might be present within the fiber bed to 1/10th of its size. This presence of nitrogen also serves to further force the viscous precursor/catalyst material into voids filled with the soluble vapor. This step of introducing nitrogen, like the previously described compaction step, is optional. Indeed, if the fiber bed is to be press-formed in the manner described immediately above, it may not be necessary to provide this latter step.

The process of polymerization and solidification can take place under the sustained nitrogen pressure, and subsequent curing can be carried out with or without pressure, so long as the vessel is vented. Where the catalyst is of the temperature activating type, as indicated previously, the chamber must be heated. Infrared lamps or band heaters can be used, or the entire vessel can be inserted into an oven, as stated previously. Once the fiber-containing mixture hardens, it is allowed to cure in its own vapor to preclude gradients and achieve uniform properties near open surfaces. During curing, cross linking continues, and water, as well as light organic contaminants, are driven off. If desired, the curing may be interrupted when the specimen is not brittle, and various machining operations can be carried out including sawing, drilling, turning, and threading. Curing of the polymerized solid is best continued over approximately 100 hours with a substantially uniform rise rate of temperature over that time, ending at temperatures on the order of 300°-400° C. Rapidity of temperature rise is to be avoided since it leads to ejection of flakes of material. This may be size dependent and the above rule is used for bodies of approximately 100 millimeters in dimension. Whether or not the curing is done in inert gas, it should be done in a closed, but vented, vessel, as indicated above, to maintain surface equilibrium with the volatile materials removed, and to avoid gradients of "drying" in the body. If not already machined, the cured polymer may be sawed at this time, or drilled, sanded and/or otherwise worked.

The cured convoluted fiber-containing polymer is now ready for pyrolyzation. To this end, it is introduced to a furnace where it is blanketed with inert atmosphere, for example, an atmosphere of nitrogen, argon, or $CO_2$, or enclosed so as to be surrounded by the gaseous products of pyrolysis. The heating cycle during this step must include a slow rise (e.g., about 1°–10° C./hour) in the initial stage, where solvents and/or organic constituents are emitted. This is continued through the main stages of decomposition, where the principal aim is to maintain uniform temperature across the body. This is aided by the conductivity provided by the convoluted fibers, especially metal fibers such as the preferred bronze fibers. Typically the main reaction is complete in the case of furfural alcohol polymers by about 500° C. Above this temperature, a more rapid temperature rise may be used (approximately 1° C./minute) up to 1000° C. An annealing or stabilization process is then accomplished by steady "soak" at 700° C. to 1200° C., for a minimum of ten hours, and preferably for 24 hours.

After the convoluted fiber-containing polymer has been pyrolyzed to form fiber-containing vitreous carbon, it may be cooled down in a relatively rapid manner, proceeding successfully at the furnace off/cool down rate of about 200° C./hour. It is desirable that air not be drawn in at the initial high temperature and inert gas can be supplied at a any suitable predetermined rate, with the following limitations. First, gas flow should not provide significant cooling, particularly local cooling which may produce thermal stress. Second, volumetric flow rate should be sufficient to preclude drawing air into the chamber containing the vitreous carbon. The rate of contraction may be controlled by slowing the cooling rate (ramping down of the furnace) until sufficiently low temperature is reached for oxidation to be insignificant, for example, less than 500° C.

The ultimate fiber-containing vitreous carbon product may be ground, electric discharge machined, ultrasonically machined, lapped, abraded, polished, rubbed, diamond sawn and diamond drilled. The polished or lapped surface of the material may be engraved by laser machining. Further, ground balls from the vitreous carbon composite material have been provided, and it has been demonstrated experimentally that they will sustain sufficient stress to be useful in self-lubricated ball bearings. Moreover, embedded objects of metal or ceramic may be carried through the firing sequence without damage to the ultimate product. Particularly successfully has been the embedding of copper or copper alloy tubes, which may serve as electrical connectors, or threadable anchors for screws. Embedded bodies may also serve as connectors for soldering. In addition, it has been demonstrated that solder will wet and bond to the exposed fiber-metal in the face of the cut, lapped, or polished composite.

Having described different wear-resistant structures and their particular method of manufacture in accordance with the present invention, attention is directed to certain details relating both to the end product and the process for making the end product. At the outset, it should be noted that the final fiber-reinforced vitreous carbon composite material is non-granular in character. That is, the continuous phase vitreous carbon is homogeneous and is devoid of grain boundaries, even though, size-wise, it may be at least 100 mm in each of its three coordinate directions (x, y and z axes). This is to be contrasted with prior art materials of at least the same size, which by necessity have heretofore been formed from particulate carbon, which has been formed into a composite with a resin or other adhesive (cohesive) medium, typically a thermosetting resin. The resulting prior art composite structure (carbon particles and resin) typically is consolidated under heat and pressure to form a unitary product mass, but because of the particulate character of the carbon starting material, the end product is characterized by grain boundaries in the material which are typically fairly large, approaching one micron in dimension, and clearly visible under corresponding magnifications of the composite. By contrast, the composite materials of the present invention are non-granular, monolithic materials which are free from such grain boundaries. Thus, the prior art vitreous carbon articles of a significant size (10 mm–100 mm in each of the three dimensions, length, width and thickness) have been found to include sub-micron grain boundaries. These prior art materials typically are formed by hammer and ball milling of particulate carbon to form the starting carbon particles. The resulting composites typically contain only about 15% glassy carbon (vitreous carbon). Hence, while many vitreous carbon thin section elements have been produced, as just indicated, the process methodology of the present invention, as described above, permits non-granular matrix vitreous carbon articles of at least 100 mm in each of its three dimensions (x,y,z) to be achieved.

With particular regard to the convoluted fibers forming part of the overall composite structure, as indicated previously, the wool or mesh or woven (e.g. convoluted) configuration of the reinforcing fiber is very important for a number of reasons to be discussed now. One such reason is especially appropriate when the fibers selected are metallic fibers having high thermal conductivity. Specifically, during the initial formation process of the ultimately formed composite structure, the fiber mesh is subjected to exterior heating conditions (from the containment vessel, oven, etc.). This, in turn, provides heat input to the composite being formed, so that there are negligble thermal gradients within the composite mass as it is being formed. In other words, the metallic mesh serves to distribute heat and minimize temperature gradients so that no substantial temperature differential exists between the outer portion of the curing mass and its center. In the absence of such fiber mesh, the precursor material used in forming the mass would be substantially hotter at the composite exterior surface in contact with the heating surfaces. This could result in substantial differential shrinkage, and preferential spalling, cracking, etc., at the exterior surface of the resinous body.

As indicated previously, preferred mesh (fiber) materials of construction include copper, copper-alloys (brass and bronze), nickel, and chrome-plated steel. Ideally what is desired is a metallic wool having very springy character. As a definition of the term springy, if a curved fiber is mashed flat, the bending strain, $\epsilon$, at its outer surfaces would be given by the equation $\epsilon = r/R$, where r is the nominal fiber radius (in cross-section), and R is the radius of curvature. Permissible strains for copper alloy fiber, for example, before annealing, are less than $2 \times 10^{-3}$. If r equals 50 microns, then R should be greater than $25 \times 10^{-3}$ microns, or 25 mm, or about 1". This definition is a conservative criterion of full spring-back. One would expect sufficient recovery to preserve fiber spacing for an R that is $\frac{1}{2}$ the calculated value.

As also indicated above, a preferred fiber material is a mesh or wool of copper alloy fibers. These preferred fibers may suitably have a diameter of 30-50 microns, with a composition (in weight percent) of, e.g., 0.05% lead, 0.10% iron, 0.15% tin, 0.20% zinc, 0.10% aluminum, 1.1% silicon, 0.1% nickel, and the balance copper. The lower limit for the length of the convoluted fibers is on the order of about 1 cm. Preferred convoluted fibers have a radius of curvature/diameter ratio which is in the range of about 5:1 to about 20:1 (the radius of curvature and the diameter being measured in the same dimensional units).

Still referring specifically to the preferred copper or copper-based fibers, it should be noted that the elastic modulus of copper is five times greater than the elastic modulus of vitreous carbon and, hence, is therefore five times stiffer. However, the yield strength is about the same for both, and hence, the matrix material has greater permissible elongation before yield. Therefore, where coupled at an interface, the copper would yield first, absorbing considerable energy. This effect is believed to substantially toughen the end product.

Returning to metal wool fibers generally, in various of the composites made to date, the metal wool fibers have comprised a diameter on the order of about 0.1 mm, and a radius of curvature of about 1 mm. The diameter of the fiber preferably is from about 0.001 to about 0.01 inch. Outside the range of 5:1 to 20:1, the radius of curvature and diameter values tend to be inconsistent with the achievement of good reinforcement of the composite, and the provision of a reinforcing network of metal which will produce low thermal gradients across the composite during its formation. In this respect, the metal filaments of the mesh serve to define channels in the composite as it is cured, by means of which vapor is released during pyrolysis. In other words, vapor is preferentially channeled along the metal filaments of the mesh and out of the composite, during its formation.

With particular regard to the way in which the ultimately formed vitreous carbon material and the convoluted fiber work together in the final composite structure, it should be noted that the precursor shrinks substantially (to about half its original volume), during the heating and pyrolysis steps in the formation process. As a result, the final composite is characterized by stress fields surrounding the reinforcing filaments, such that the filaments tend to be in compression in the matrix. To accommodate this, there must be a plastic yielding around the fibers. This flow process is complex and includes a component of creep or slow viscous flow. As a result, the ultimately formed composite structure is highly resistant to impact, and has a high impact damping characteristic. The fact that the metal-carbon interface is in compression eliminates the bonding problem between metal and carbon encountered in powder technology composites. In addition, when the convoluted fiber used is a metallic mesh, the ultimately formed structure achieves a high measure of thermal shock resistance. In monolithic vitreous carbon material without such reinforcement, for example, placing a welding torch in proximity with the material surface will cause spalling and popping off of flakes of the vitreous carbon, as a result of the production of thermal gradients. No such effect is seen when a welding torch is brought into contact with the surface of a corresponding composite structure of the present invention, thereby confirming that it indeed has high thermal shock resistance.

As indicated previously, the preferred process used in forming the ultimate composite structure involves impregnating the fiber mesh with resinous precursor material, so that the resin is infused into the mesh or wool, whereby a high degree of structural uniformity and reinforcement of the resulting composite is achieved. This is to be contrasted with prior art composites employing discrete (chopped) fibers. These latter composites may encounter preferential settling of fibers in the curing resin, particularly when the fibers are metal or otherwise heavy in character. This settling may result in fiber-rich and fiber-lean regions in the composite which are detrimental to the ultimate composite's utility and which render the composite deficient or even useless for its intended purpose.

While the present invention has been described with reference to specific embodiments and compositions, it will be appreciated that numerous modifications, variations, and embodiments are possible, and accordingly these modifications, variations, and embodiments are to be regarded as being within the spirit and scope of the invention.

Moreover, it is to be understood that the present invention is not intended to be bound by any theory or mechanism as regards the superior morphological and functional characteristics of the vitreous carbon composite material of the present invention. The structure of the vitreous carbon continuous phase at the molecular level must possess certain characteristics, to be consistent with the performance data and behavior which have been observed for the material of the invention. It is speculated that there will be a plethora of conjugated single and double carbon-carbon bonds in the vitreous carbon material of the invention, with a substantial portion of the carbon skeleton part of the matrix being aromatic in the sense of electron delocalization.

Since the process for making vitreous carbon in the present invention involves the introduction of energy into the carbonaceous material followed by a long annealing/cooling cycle, it seems probable that much progress towards thermal dynamic equilibrium should be evident in the finished material. This would favor the net formation of large spatial scale aromatic systems, as the individual monomer units from the precursor material are chemically united in the pyrolyzed vitreous product.

It may therefore be that the vitreous carbon of the invention contains a significant amount of carbon molecular forms such as buckminsterfullerene, a hexagonal carbon structure having six fused pentagons, with each pentagon having five fused hexagons associated therewith, so that the resulting molecule ($C_{60}$) is fully aromatic. Alternatively, other aromatic carbon molecular forms, e.g., $C_{72}$ clusters, may be present in the vitreous carbon material of the invention. The existence of such aromatic spherical carbon molecules would be consistent with the results observed for the vitreous carbon materials of the invention, with the hollow carbon clusters acting as molecular ball-bearings in the structure to impart superior tribologic properties to the composite.

What is claimed is:

1. A reinforced composite material, having a three-dimensional (x,y,z) character, wherein each of the dimensions is at least 100 millimeters, and consisting essentially of:
   (a) from about 70% to about 95% by volume, based on the total volume of (a) and (b), of a homogeneous, grain boundary-free continuous phase vitreous carbon material; and
   (b) from about 5% to about 30% by volume, based on the total volume of (a) and (b), of convoluted reinforcement fibers having a radius of curvature diameter ratio in the range of from about 5:1 to about 20:1.

2. A reinforced composite material according to claim 1, wherein the convoluted reinforcement fiber content of said material is from about 5% to about 75% by weight.

3. A reinforced composite material according to claim 1, wherein said convoluted reinforcement fibers are bronze wool fibers.

4. A reinforced composite material according to claim 3, wherein said bronze wool fibers have a mean diameter between about 50 and 100 micrometers and a length of up to about 1 meter.

5. A reinforced composite material according to claim 1, wherein said vitreous carbon material is a liquid precursor material which has been polymerized by means of a catalyst and then pyrolyzed.

6. A reinforced composite material according to claim 1, wherein said convoluted reinforcement fibers are interspersed throughout said continuous phase of vitreous carbon material in a randomly oriented mesh.

7. A reinforced composite material according to claim 1, comprising a sealing member.

8. A reinforced composite material according to claim 1, comprising a brake lining.

9. A reinforced composite material according to claim 1, comprising an electrical motor brush.

10. A reinforced composite material according to claim 1, comprising a bearing member.

11. A reinforced composite material according to claim 1, wherein said convoluted reinforcement fibers are bronze wool fibers having non-uniform diameters between about 50 and 100 micrometers, and lengths up to at most about 1 meter.

12. A reinforced composite material according to claim 1, wherein the convoluted reinforcement fibers constitute a mesh structure in the composite material, wherein the fibers touch one another only at occasional points.

13. A reinforced composite material according to claim 12, wherein the convoluted reinforcement fibers are formed of a material selected from the group consisting of copper, copper alloy, nickel, and chrome-plated steel.

14. A reinforced composite material according to claim 1, wherein the continuous phase vitreous carbon material has been formed by catalysed polymerization and subsequent pyrolysis of furfural alcohol resin.

15. A reinforced composite material according to claim 14, wherein the polymerization has been carried out at a temperature of from about 90° C. to about 100° C.

16. A reinforced composite material according to claim 15, wherein curing of polymerized solid resulting from said polymerization has been carried out at a substantially uniform rise rate of temperature over approximately 100 hours to a final temperature on the order of 300° C.–400° C., followed by pyrolysis comprising heating at a rate of from about 1 to about 10° C./hour to an upper pyrolysis temperature of about 500° C., followed by further heating at a rate of about 1° C./minute to an upper temperature not exceeding 1000° C., followed by annealing at a temperature of from about 700° C. to 1200° C. for a minimum of 10 hours.

17. A reinforced composite material according to claim 1, wherein the convoluted reinforcement fibers have a diameter in the range of from about 0.001 inch to about 0.01 inch.

* * * * *